United States Patent [19]

Wilhelm et al.

[11] Patent Number: 4,831,703

[45] Date of Patent: May 23, 1989

[54] APPARATUS AND METHOD FOR PLUGGING A TUBE

[75] Inventors: John J. Wilhelm, New Kensington; Kenneth D. Kolberg; William G. Cole, both of Monroeville; Gregory L. Calhoun, Allegheny Township, Westmoreland County, all of Pa.

[73] Assignee: Westinghouse Electric Corp., Pittsburgh, Pa.

[21] Appl. No.: 203,650

[22] Filed: Jun. 3, 1988

Related U.S. Application Data

[63] Continuation of Ser. No. 936,559, Dec. 1, 1986, abandoned.

[51] Int. Cl.[4] .............................................. B21D 53/00
[52] U.S. Cl. ........................ 29/157.4 R; 29/157.3 R; 29/157.3 V; 29/523; 29/727; 29/522.1; 138/89
[58] Field of Search ................ 29/157.4 R, 157.3 R, 29/157.3 V, 157 R, 469.5, 421 R, 522 R, 523, 726, 727, 33 T; 138/89, 93, 96; 165/71; 220/233, 239

[56] References Cited

U.S. PATENT DOCUMENTS

| | | |
|---|---|---|
| 1,646,431 | 9/1921 | Tomkinson . |
| 3,505,846 | 4/1970 | Smida . |
| 3,525,365 | 10/1970 | Meulendyk . |
| 3,691,609 | 9/1972 | Ice, Jr. et al. . |
| 4,069,573 | 1/1978 | Rogers, Jr. et al. . |
| 4,125,937 | 11/1978 | Brown et al. . |
| 4,366,617 | 1/1983 | Nanstiel et al. . |
| 4,369,662 | 1/1983 | Rieben et al. . |
| 4,390,042 | 6/1983 | Kucherer et al. . |
| 4,393,564 | 7/1983 | Martin . |
| 4,393,674 | 7/1983 | Rasmussen . |
| 4,436,117 | 3/1984 | Martin . |
| 4,502,308 | 3/1985 | Kelly . |
| 4,502,511 | 3/1985 | Zafred . |
| 4,557,128 | 12/1985 | Costabile . |
| 4,581,801 | 4/1986 | Kobuck et al. . |
| 4,637,436 | 1/1987 | Stewart, Jr. et al. . |
| 4,660,270 | 4/1987 | Ruben et al. ............... 29/400 N |
| 4,672,741 | 6/1987 | Zafred et al. .............. 29/400 N |

FOREIGN PATENT DOCUMENTS

| | | |
|---|---|---|
| 058850 | 1/1982 | European Pat. Off. . |
| 044982 | 3/1982 | European Pat. Off. . |
| 120277 | 3/1984 | European Pat. Off. . |
| 2514099 | 8/1983 | France . |
| 57-136325 | 2/1984 | Japan . |
| 59-27195 | 6/1984 | Japan . |
| 61-116297 | 3/1986 | Japan . |
| 567666 | 8/1943 | United Kingdom . |
| 1211810 | 8/1968 | United Kingdom . |
| 2074914 | 11/1981 | United Kingdom ............ 29/523 |
| 2100386 | 12/1982 | United Kingdom ............ 29/727 |

Primary Examiner—Howard N. Goldberg
Assistant Examiner—Irene Cuda

[57] ABSTRACT

Both an apparatus and method for plugging a conduit, such as a tube in the tubesheet of a nuclear steam generator, is disclosed herein. The plugging apparatus generally comprises an inelastically expandable plug that contains a fluid-receiving cavity, and an expansion means including both a source of pressurized hydraulic fluid and a pull-rod member having a piston for advantageously applying both a radially expansive force and a compressive force to the plug at the same time in order to inelastically expand it into sealing engagement with the inner wall of a tube. In the apparatus of the invention, the compressive force exerted on the plug by the pull-rod member not only serves to inelastically deform the plug into a radially expanded shape, but is also used to seal the open end of the plug so that the pressurized hydraulic fluid admitted within the cavity of the plug will not escape. Both the apparatus and method of the invention are particularly well suited for installing plugs in tubes surrounded by relatively inelastic structures, such as tubesheets. Additionally, the invention conveniently and reliably plugs small diameter tubes in the peripheral regions of these tubesheets.

45 Claims, 2 Drawing Sheets

APPARATUS AND METHOD FOR PLUGGING A TUBE

BACKGROUND OF THE INVENTION

This application is a continuation of application Ser. No. 936,559, filed Dec. 1, 1986, now abandoned.

Field of the Invention

This invention generaly relates to plugging tubes by means of a radially expandable plug, and specifically concerns both an apparatus and a method for hydraulically plugging relatively small diameter heat exchange tubes that are surrounded by a structure that is not inelastically deformable, such as a tubesheet.

Description of the Prior Art

Plugging devices for plugging the heat exchanger tubes in nuclear steam generators are known in the prior art. Generally, such devices are used to seal off one or more of the U-shaped heat exchanger tubes contained within the nuclear steam generator when the walls of these tubes become corroded beyond repair. If such tubes are not plugged or repaired, they may crack and allow radioactive water from the primary side of the generator to leak into the non-radioactive water in the secondary side. This, in turn, could result in the radioactive contamination of the non-radioactive steam that Westinghouse-type nuclear generators provide to turn the turbines of the electric generators of the plant. Hence the plugging of potentially defective heat exchanger tubes is an important maintenance operation that must be reliably carried out.

Such prior art plugs generally comprise a tubular shell that is open on one end and closed at the other end, and which contains a frustroconically shaped expander member. In one type of prior art plug, the expander element is a round wedge shaped like a common cork used to seal a bottle, and is disposed completely within the interior of the shell with its larger circular end in abutment with the inner surface of the closed distal end of the plug shell. Instead of being cylindrical, the interior walls of the shell are slightly tapered by increasing the thickness of the shell walls from the distal closed end to the proximal open end. When the cork-shaped wedge is forcefully pulled from the closed end toward the open end of the shell by a hydraulic ram, it will radially expand the plug into sealing engagement with the inner wall of a tube by a wedging action. such a plug design is completely described in U.S. Pat. No. 4,390,042 invented by Harvey D. Kucherer and assigned to the Westinghouse Electric Corporation. In this particular plug design, the cork-shaped expander wedge is forcefully pulled from the distal to the proximal end of the plug shell by means of a pull-rod that is connected to the expander element on one end and to a hydraulic ram on the other end along the longitudinal axis of the expander member.

In most instances, this particular plug design is capable of reliably and conveniently plugging the open ends of a corroded U-shaped tube in regions where the tube is surrounded by a structure that is not inelastically deformable, such as the thick steel tubesheet that divides the primary from the secondary side of the steam generator. The forceful pulling of the cork-shaped expander member along the axis of the shell not only radially expands the wall of the shell outwardly as the member is wedgingly drawn toward the proximal end of the shell, but further applies an extruding force to the metallic walls of the shell along the longitudinal axis of the tube. In a variation of this design, an explosive charge is used in lieu of a hydraulically operated pull-rod to move the cork-shaped wedge along the longitudinal axis of the tube shell. In such plugs, the expansion member is situated near the open end of the tubeshell, and the explosive charge is disposed between the proximal end of the shell and the top surface of the expansion member. When the charge is detonated, the cork-shaped wedge is pushed along the longitudinal axis of the shell until it abuts the closed distal end of the plug.

Unfortunately, there are certain mechanical limitations associated with these prior art plug designs that interfere with their usefulness in certain applications. For example, in plugs wherein a pull-rod is used to draw the cork-shaped wedge against the internally tapered walls, there is a limit as to the inner diameter of the tubes that such plugs can reliably seal. In nuclear steam generators utilizing heat exchanger tubes having inner diameters of approximately 0.50 inches or greater, this mechanical limitation poses no problem. On the other hand, for tubes whose inner diameter is less than 0.50 inches, it becomes increasingly difficult to design a pull-rod capable of withstanding the tensile force necessary to draw the cork-shaped wedge throughout the entire longitudinal axis of the tubeshell. Even when the pull-rod is formed from the strongest commercially available materials, such as Vascomax ®, it will have a tendency to break off in small diameter plugs since its own external diameter can be no larger than the minimum internal diameter of the tapered interior of the plug shell, and since the tensile strength of any material decreases exponentially with its diameter. One way of solving this problem is to reduce the angle of both the cork-shaped wedge and the tapered walls within the plug shell. However, to obtain the same quality of seal, the plug must be lengthened. While the use of longer plugs poses no problem in tubes centrally located in the tubesheet, they are difficult if not impossible to use in the peripheral tubes of the tubesheet due to the long stroke the pull-rod member has to make to completely pull the wedge through the plug shell.

Still another limitation of this prior art design arises from the size of the hydraulic ram that is required to apply the tensile force necessary to draw down the cork-shaped wedge. Such rams typically require a minimum diameter of about 4.50 inches. Yet, around the periphery of the tubesheet, only a clearance of 0.50 inches exists between the tube and the bowl-shaped wall that forms the primary side of the nuclear steam generator. Hence, it is difficult to provide a sufficiently powerful ram that is compact enough to be easily manipulated in the limited space surrounding the peripheral heat exchanger tubes.

In an attempt to solve the foregoing problems the previously mentioned explosive-type plugs were developed. But while the use of explosives obviates the need for pull-rods and hydraulic rams, such devices create other problems as serious as the ones they solve. To minimize the amount of down-time necessary to complete the plugging operation, the explosive plugs are usually positioned and detonated simultaneously. However, the simultaneous detonation of a plurality of such plugs generates powerful mechanical shock waves that can break weakened sections of the U-shaped heat exchanger tubes that are not being plugged, thereby defeating the overall purpose of the plugging operation. These shock waves can also damage the sensitive monitoring instrumentation present on all nuclear steam generators. Additionally, the special arrangements that are necessary for the transportation of such explosively operated devices, and the necessity for licensed explosives technicians to install such plugs has made them substantially more expensive to use than plugs which are expanded by a pull-rod.

Still another limitation associated with both of these prior art plugs is the relatively narrow range of inner diameter tube dimensions that a plug having a particular outer diameter can accommodate. Specifically, such prior art plugs can only accommodate tubes having an inner diameter that is less than 60 mils greater than the outer diameter of the plug. Since the inner diameter of the heat exchanger tubes often varies some between tubes in the same nuclear steam generator and can vary considerably between different steam generators, the manufacture of many different sizes of such plugs is necessary. This limitation requires the maintenance operators that perform the plugging operation to carry a large inventory of different plug sizes in order to in-service any given utility. A final limitation inherent in both design variations stems from the fact that the cork-shaped expander wedge remains within the tapered interior of the plug shell after the plugging operation. The permanent presence of this wedge in the plug interior makes it difficult to inspect the interior of the plug for leakage. This is a significant drawback, since federal regulations require utilities operating nuclear steam generators to make frequent and thorough inspections of these devices in order to minimize the chances of malfunction.

Clearly, there is a need for a new type of plugging apparatus that is capable of reliably plugging small diameter as well as large diameter heat exchanger tubes in nuclear steam generators. Ideally, such a device should be easily installable even in heat exchanger tubes of limited access, such as the tubes situated around the periphery of the tubesheet. Additionally, it would be desirable if this device were capable of succesfully and reliably plugging heat exchanger tubes of widely varying inner diameters with plugs of a single size in order to minimize the number of sizes of such plugs that must be carried to a particular utility. Finally, the interiors of the plugs installed should be readily inspectable at any time after installation.

SUMMARY OF THE INVENTION

In its broadest sense, the invention is a plug containing a fluid-receiving cavity that is radially deformable into sealing engagement with the inner wall of a conduit such as an Inconel ® tube when a radially expansive force and a compressive force are simultaneously applied thereto. The apparatus may include an expansion assembly that includes a combined hydraulic expander and pull-rod mechanism for simultaneously applying a radially expansive hydraulic force within the cavity of the plug and a compressive force across the plug in a direction that is substantially in alignment with the longitudinal axis of the tube. The combination of the radially expansive force and the compressive force inelastically deforms the plug into sealing engagement within the tube even in cases where the tube is surrounded by a structure that is difficult to inelastically deform, such as the thick steel tubesheet of a nuclear steam generator.

The compressive force applied onto the plug by the expansion mechanism may also be used to sealingly engage the open end of the plug against a sealing member in order to prevent the escape of pressurized hydraulic fluid from the cavity within the plug. This same compressive force may further be used to counteract a net force on the plug along the longitudinal axis of the tube that is created by the injection of pressurized hydraulic fluid into the plug cavity, and to thereby stationarily position the plug within the tube during the expansion operation.

The pull-rod mechanism of the expansion assembly includes a pull rod member, and the plug includes a means for detachably connecting the distal end of the pull rod member to a point along the distal end of its internal cavity. This connecting means is preferably formed from mating threads on the distal end of the pull rod member and the distal end of the plug cavity. In order to conduct the pressurized hydraulic fluid to the internal cavity of the plug, the pull-rod member may be dimensioned so that an annular space is defined between the outer surface of the rod and the internal surface of the plug, and the expansion mechanism may also include a bore for conducting this fluid in this annular space. Finally, the pull-rod member may include a piston means that communicates with the pressurized hydraulic fluid for generating a tensile force on the distal end of the pull-rod member from the pressure of the fluid admitted into the plug during the expansion operation. In the preferred embodiment, the diameter of the proximal end of the pull rod is larger than the diameter of the distal end of the rod, and the working face of the piston means is formed at the junction between the two ends.

The plug may be formed from a shell having a closed distal end and an open proximal end that leads into the aforementioned fluid-receiving cavity. The plug may further have a substantially cylindrical middle portion that circumscribes the fluid-receiving cavity. This middle portion preferably has relatively thin walls while the walls of the shell in the distal and proximal portions that flank the middle portion are preferably thicker in order to facilitate the deformation of the middle portion of the shell into a radially expanded shape. To further facilitate the desired radial deformation, these thicker flanking shell walls may each include a tapered section whose thinnest portions meld with the distal end proximal edges of the middle portion of the shell. These tapered wall sections may be formed by providing enlarged, frustroconical tapers on the outside distal and proximal sections of the plug shell, or by forming the cavity in the interior of the shell with what is known as a "bottle bore" in the art. In both embodiments of the plug, the middle portion is preferably circumscribed by six uniformly spaced lands, each of which is slightly tapered along its exterior edge in order to effect a localized region of sealing between the exterior of the plug, and the interior wall of the tube.

The invention further encompasses a method of plugging a conduit with a plug containing a cavity that generally comprises the step of applying a radially expansive force within the cavity while simultaneously applying a compressive force on the plug in a direction that is orthogonally disposed with respect to the radially expansive force. In the preferred method of the invention, the compressive force is generated by applying a hydraulically generated tensile force to the aforementioned pull-rod in the range of between about 3,000–25.000 pounds, depending upon the plug diameter. Additionally, the radially expansive force is generated by conducting fluid within the cavity of the plug that is pressurized to between about 20,000 and 32,000 psi.

The apparatus and method of the invention provide a convenient and reliable way to plug both small diameter and peripherally located tubes within the tubesheet of a nuclear steam generator. Because no expander element is left in the interior of the plug after the plugging operation is performed, the resulting plug is easily inspectable.

BRIEF DESCRIPTION OF THE SEVERAL FIGURES

DETAILED DESCRIPTION OF THE PREFERRED EMBODIMENT

Figure 1A:
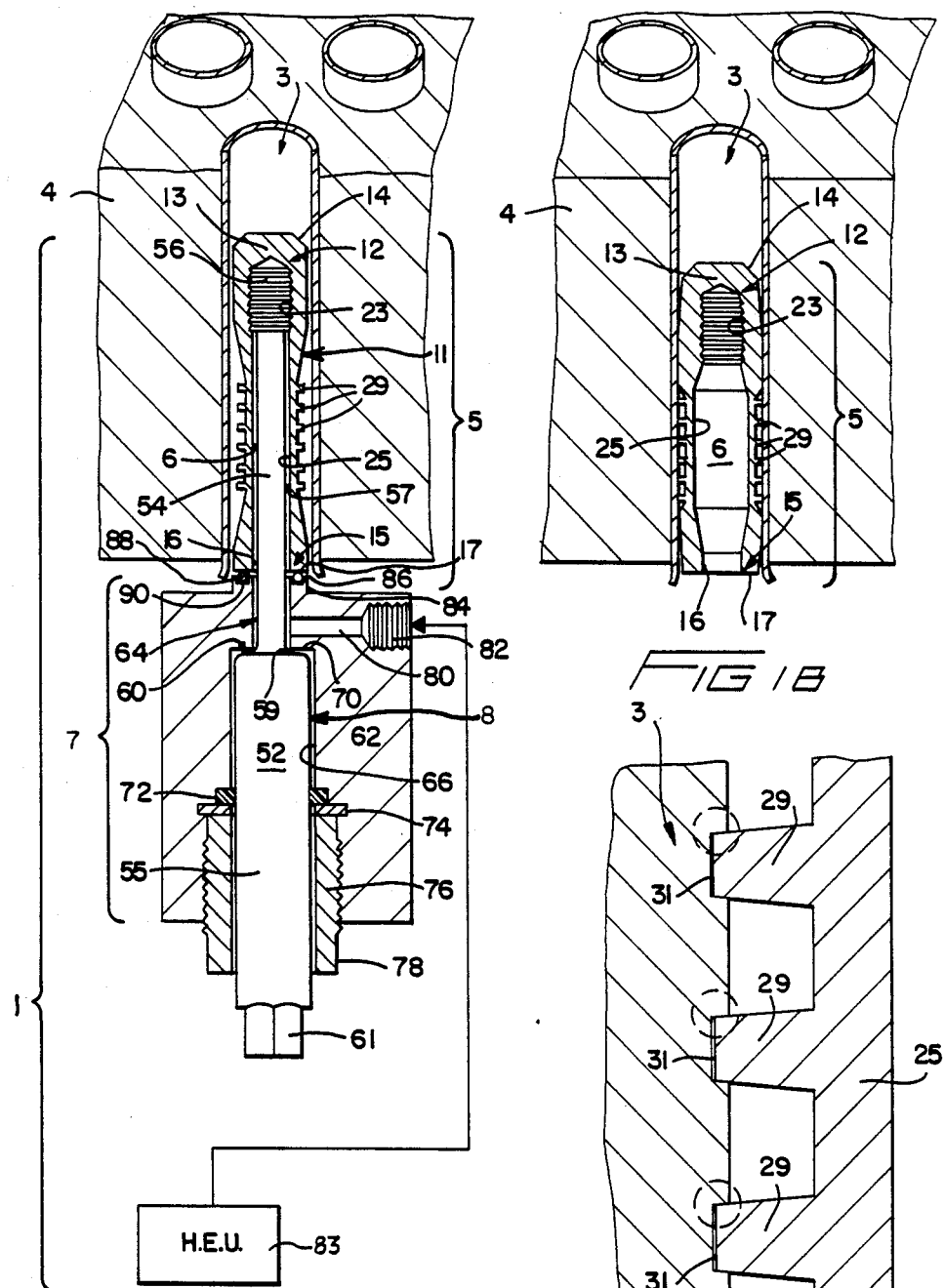
FIG. 1A is a cross-sectional side view of the plugging apparatus of the invention inserted into the open end of atube in a tubesheet before the plug has been expanded.
Figure 1B:
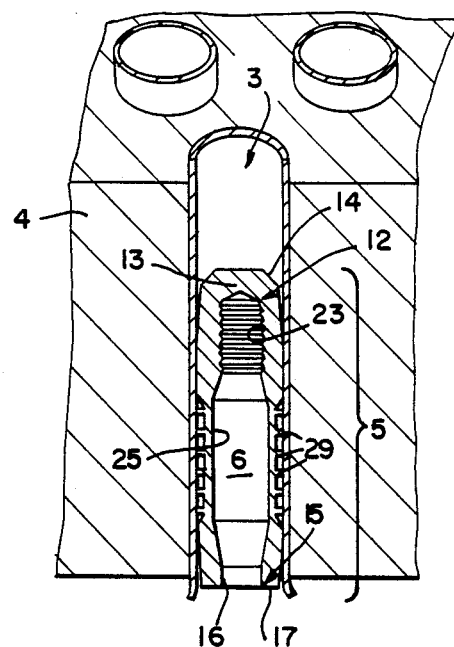
FIG. 1B is a cross-sectional side view of the plug illustrated in FIG. 1A expanded into sealing engagement with the inner walls of a tube in a tubesheet with the expander assembly removed.

With reference now to FIGS. 1A and 1B, wherein like reference numerals designate like components throughout all the several figures, the tube plugging apparatus 1 of the invention is particularly adapted for plugging Inconel ® tubes 3 mounted in the tubesheets 4 of nuclear steam generators. Generally speaking, the plugging apparatus 1 comprises a plug 5 having a concentrically disposed cavity 6, and an expansion assembly 7 that is connected to a source of pressurized fluid and which has a hydraulically operated pull-rod mechanism 8 for applying both a radially expansive force and a compressive force on the plug 5.

Figures 2, 3:
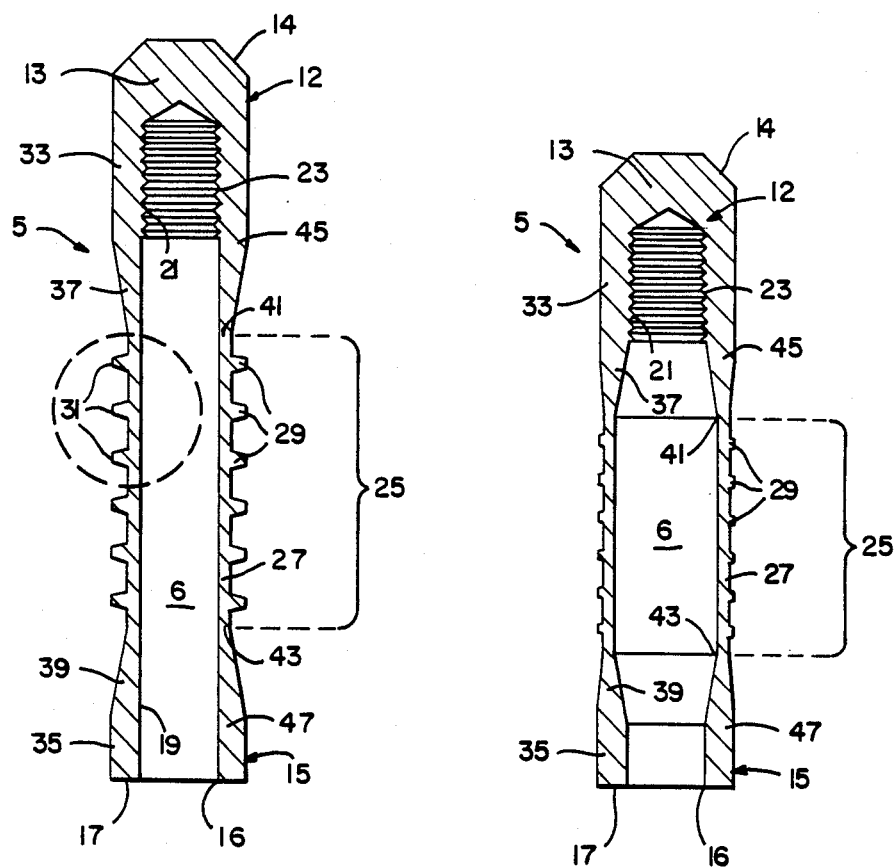
FIG. 2 is a cross-sectional side view of a first embodiment of the plug used in the plugging apparatus of the invention.
FIG. 3 is a cross-sectional side view of a second embodiment of the plug used in the plugging apparatus of the invention.

With reference now to FIGS. 1A, 2 and 3, the plug 5 of the invention is formed from a generally tubular shell 11 having a distal closed end 12 that terminates in a wall 13 whose outer surface is circumscribed by a chamfer 14, and a proximal open end 15 having a circular opening 16 circumscribed by a flat annular wall 17. In both of the embodiments of the plug illustrated in FIGS. 2 and 3, respectively, the proximal end of the cavity 6 terminates in the circular opening 16, while the distal end 21 of this cavity 6 terminates at the inner surface of the wall 13. Additionally, the distal cavity ends 21 of both of the plug embodiments are surrounded by a plurality of threads 23 for engagement with a pull-rod member that will be described hereinafter.

Both of the plug embodiments illustrated in FIGS. 2 and 3 further include a tubular middle portion 25 where the shell wall 27 is relatively thin with respect to the flanking walls. The exterior of the middle portion wall 27 is circumscribed by six, equidistantly spaced lands 29, each of which includes a tapered outer edge 31. The middle portion wall 27 is flanked by thicker distal and proximal wall sections 33 and 35, respectively. Each of the distal and the proximal thicker wall sections 33 and 35 includes a tapered section 37 and 39. In both preferred embodiments, the angle of the taper of the sections 37 and 39 is approximately 10° with respect to the longitudinal axis of the plug 5. Each of the tapered sections 37 and 39 includes an inner edge 41, 43 that melds in with the relatively thinner wall 27 of the middle portion 25, as well as an outer edge 45, 47 that melds in with the relatively thicker wall sections 33, 35 located on the distal and proximal ends of the plug 5, respectively.

The principal structural difference between the plug illustrated in FIG. 2 and the plug illustrated in FIG. 3 is that the cavity 6 of the FIG. 3 embodiment is formed by a "bottle bore" rather than from a cylindrically shaped bore. The bottle bore has the effect of tapering thw wall portions 37 and 39 from the inside of the plug 5, rather than from the outside, as is the case in the FIG. 2 embodiment. Finally, the FIG. 3 embodiment is somewhat shorter along its longitudinal axis than the FIG. 2 embodiment. There are structural advantages associated with each embodiment. The FIG. 2 embodiment is the easiest to manufacture, since the cavity 6 and circular opening 16 are formed by a simple, cylindrical bore. However, since the tapered sections 37 and 39 must be provided on the outside of the shell 11, the lands 29 must be manufactured with a fairly large radial extent relative to the uter surface of the middle portion 25 of the plug 6 if they are to engage the inner wall of the tube 3 at the end of the expansion operation. The FIG. 3 embodiment solves the need for manufacturing such rdaially long lands by providing the required tapered sections 37 and 39 with a bottle bore. But since the provision of such a bottle bore significantly increases the manufacturing cost of the FIG. 3 embodiment of the plug 5, neither embodiment is strongly preferred over the other.

With reference again to FIG. 1A, the pull-rod mechanism 8 of the expansion assembly 7 includes a pull-rod member 52 having a distal shaft 54 that is integrally and concentrically connected with a relatively thicker proximal shaft 55 at joint 59. An annular piston face 60 is defined around the upper end of the joint 59. This piston face 60 generates and applies a tensile force on the distal shaft 54 whenever pressurized hydraulic fluid is applied thereto. Since the expansion assembly 7 is designed so that the piston face 60 communicates with the pressurized fluid injected into the cavity 6 of the plug 5, the provision of the piston face 60 is a highly advantageous feature, since it obviates the need for a separate hydraulic ram to apply a tensile force on the pull-rod member 52. The narrow distal shaft 54 of the pull-rod member terminates in a plurality of threads 56 which are matable with the threads 23 present around the distal end of the cavity 6 in each embodiment of the plug 5. The distal shaft 54 of the pull-rod member 52 has a smaller outer diameter than the inner diameter of the cavity 6 in each embodiment of the plug 5, so that an annular space 57 is defined between the outer surface of the distal shaft 54 and the inner surface of the cavity 6 whenever the pull-rod member 52 and a plug are threadedly mated in the manner illustrated in FIG. 1A. This annular space 57 conducts pressurized hydraulic fluid into the cavity 6 in order that the tubular middle portion 25 of the plug 6 may be expanded into sealing engagement with the inner walls of a tube 3. The bottom end of the proximal shaft 55 terminates in a square end 61 that is receivable within the socket of a wrench (not shown) when it becomes necessary to unscrew the threaded end 56 of the pull-rod member 52 from the threads 23 of the plug 5.

The pull-rod member 52 of the pull-rod mechanism 8 is slidably housed within an inlet block 62. This inlet block 62 includes a vertically disposed, telescoping bore 64 having a proximal bore section 66 that slidably receives the relatively narrower distal shaft 54 of the pull-rod member 52. An annular shoulder 70 is defined at the top of the bore section 66 that limits the extent to which the piston face 60 of the pull-rod member 52 can slide in the vertical direction within the block 62. The bottom of the bore section 66 terminates in an enlarged threaded section 67. In order to encourage a flow of hydraulic fluid into the annular space 57 defined within the plug 5 by the distal shaft 54, the outer diameter of the distal bore section 68 is deliberately made larger than the outer diameter of the distal shaft 54. By contrast, only a minimum amount of clearance is provided between the outer diameter of the proximal shaft 55 and the inner surface of the proximal bore section 66 in order to discourage the flow of hydraulic fluid out of the bottom of the inlet block 62. To prevent any hydraulic fluid which does manage to flow through the small clearance between proximal shaft 55 and bore section 66, a urethane sealing ring 72 is provided at the lower end of the inlet block 62. This ring 72 forms a seal between the proximal shaft 55 and the proximal bore section 66 without interfering with the sliding movement of the pull-rod member 52 through the block 62. To provide a tight and reliable seal, the urethane ring 72 is compressed into sealing engagement around the proximal shaft 55 by a steel compression ring 74. The ring 74 is in turn held in place by a threaded collar 76 that is screwed into the enlarged, threaded portion 67 of the bore section 66. The threaded collar includes wrench flats 78 along its bottom sides to facilitate the assembly and disassembly of the expansion assembly 7.

A laterally disposed inlet bore 80 is also provided in the inlet block 62. The left end of this bore 80 conducts pressurized hydraulic fluid upwardly to the annular space 57 between the distal shaft 54 of the pull-rod member 52 and the cavity 6 of the plug 5, and downwardly over the annular shoulder 70 and against the piston face 60. The right end of the bore 80 terminates in an enlarged, threaded end 82 for receiving a fluid-tight fitting (not shown) that connects the block 62 to a source of pressurized hydraulic fluid 83. In the preferred embodiment, the source of hydraulic fluid is Hydroswage ® brand hydraulic expander manufactured by Haskel, Inc. of Burbank, California. On the top surface of the block 62, the terminal end of the distal bore section 68 is surrounded by an integrally formed sealing ring 84. The outer diameter of the sealing ring 84 is smaller than the inner diameter of the tube 3, and the height of the ring 84 is at least one-eighth of an inch. During the expansion operation, the annular upper surface 86 of the sealing ring 84 engages the flat annular wall 17 of the plug. In order to render this engagement fluid-tight, an O-ring 88 is seated in an annular groove 90 that circumscribes the annular upper surface 86 of the ring 84. The annular groove 90 not only seats the O-ring 88, but prevents it from blowing out during the expansion operation.

In the method of the invention, a plug 5 is mounted onto the pull-rod member 52 of the expansion assembly 7 by manually inserting the distal shaft end 54 of the rod 52 into the proximal open end 15, and screwing the threads 23 and 56 finger-tight together. When the plug 5 is thus screwed into the pull-rod member 52, the flat annular wall 17 at the bottom of the plug 5 sealingly engages the top of the O-ring 88 located on the top surface 86 of the ring 84. Next, to enhance the seal between the O-ring 88 and the flat annular wall 17 of the plug 5, a pre-load tensile sealing force of between 300 and 500 pounds is applied to the pull-rod member 52 by introducing relatively low pressure hydraulic fluid into the lateral bore 80. This pressurized fluid flows downwardly against the piston face 60, where it applies a hydraulically pushing force to the pull-rod member 52. This hydraulic force in turn causes the distal shaft 54 of the member 52 to apply a compressive force to the plug 5 that securely seats its flat annular bottom 17 tightly against the O-ring 88. Of course, some of the hydraulic fluid also flows in the annular space 57 between the proximal shaft 54 and the plug cavity 6. However, the pressure at this time is not great enough to create any significant radial expansion in the plug 5.

If the plug 5 proceeds through the pre-loading step without leaking, the operator of the apparatus next inserts the plug 5 into the open end of a tube 3, and intensifies the pressure of the fluid until the shell 11 of the plug 5 is radially expanded. In the case of a plug 5 formed from Inconel ® and having a diameter of about 0.440 inches, such pressure amounts to about 28,000 pounds per square inch. The application of such pressure to the inlet block 62 creates both a radially expansive force within the plug cavity 6 that is large enough to cause it to expand, as well as a tensile force of about 1,700 pounds on the pull-rod member 52.

Figure 4:
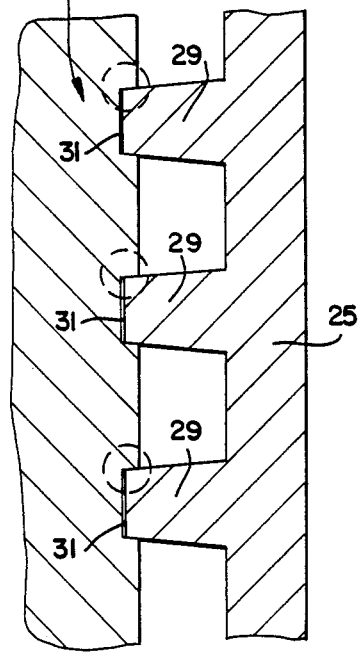
FIG. 4 is an enlarged view of the circled portion of the plug wall illustrated in FIG. 2 as it appears in sealing engagement with the inner wall of a tube.

The combination of the radially expansive force provided by the hydraulic fluid and the compressive force applied by the pull-rod member 52 has four desirable effects on the plug 5. First, the radially expansive force expands the relatively thin-walled tubular portion 25 of the plug outwardly until the lands 29 forcefully and sealingly engage the inner wall of the tube 5, while the compressive force applied by the pull-rod member 52 inelastically deforms the middle portion 25 of the plug 5 into this sealing position. The compressive force permanently deforms the middle portion 25 into this radially expanded position by providing a controlled buckling of the walls at the juncture between the tapered portions 37 and 39 of the walls of the plug 5, and the distal and proximal edges of the relatively thin-walled middle portion 25 of the plug 5. The precise shape of this buckling is evident in FIG. 1B, as well as the attendant shortening of the plug 5 along its longitudinal axis. This controlled buckling along the longitudinal axis of the plug 5 counteracts the tendency of the radially expanded middle portion 25 of the plug to "spring back" after the pressurized fluid is relieved from the annular space 57 defined between the pull-rod member 52, and the inner surface of the thin-walled middle portion 25. The second advantageous effect from the joint application of a compressive and radially expansive force on the plug 5 is the fact that the compressive force sealingly engages the annular face 17 of the plug 5 even more tightly against the O-ring 88 located on the upper surface 86 of the seating ring 84, thereby obviating the need for any sort of complex mechanism to contain the 28,000 psi pressure within the cavity 6 of the plug 5 during the plugging operation. The third advantageous effect is that the compressive force applied by the pull-rod member 52 more than counteracts the net upwardly directed force that the hydraulic fluid applies onto the plug 5, thereby holding it in a completely stationary position throughout the entire plugging operation. The fourth and final positive effect is best understood with respect to FIG. 4. The radially expansive force within the cavity 6 of the plug 5 is sufficient to force the tapered edges 31 of the lands 29 into the inner walls of the tube 3 during the plugging operation. After the radial and compressive forces are relieved from the plug 5, the Inconel® that forms the plug 5 will tend to "spring back" slightly along its longitudinal axis. This longitudinal spring back will cause the tapered ends 31 of the lands 29 to very tightly engage one of the sides of the slight notch that the lands 29 form by their forceful engagement of the wall of the tube 3 (see circled portions). While applicant has not completely confirmed this beneficial effect of the method of the invention, applicant has reason to believe at the time of the filing of this application that the invention exploits the longitudinal spring back of the plug 5 to create extremely tight sealing surfaces along the upper edges of the upper lands 29 as shown in FIG. 4, and along the lower edges of the lower lands 29 (not shown).

After both the hydraulic and the tensile forces are relieved by admitting the pressurized fluid out of the inlet block 62, the pull-rod member 52 is detached from the distal end of the cavity 6 of the plug 5 by grasping the square end 62 of the member 52 with a wrench, and unscrewing the threaded end 56 of the member 52 from the threads 23 within the plug 5. During the final plugging step, it is important to note that no part of the inlet block 62 of the expansion assembly 7 should be placed against either the bottom edge of the tube 3 or the tubesheet 4 when the fluid pressure is intensified to 28,000 psi. If the top of the block 62 were so positioned, the longitudinal spring-back of the plug 5 could cause galling to occur between the lands 29 and the inner walls of the tube 3, thereby jeopardizing the integrity of the seal.

While the preferred embodiment has been described in the context of a nuclear steam generator, the plug of the invention may be used to plug most any tube in any environment, and is particularly well suited to plug the heat exchange tubes in the tubesheets of fossil fuel power plants.

We claim:

1. A method of plugging a conduit with an inelastically deformable plug containing a cavity, comprising the step of applying a radially expansive force by containing a pressurized fluid within the cavity of the plug while applying a compressive force across the plug by connecting a pull-rod member within the plug at the distal end of the cavity and by pulling said pull-rod member while applying a counterforce onto the proximal end of the plug that prevents the plug from moving along the longitudinal axis of the conduit, said compressive forces being orthogonally disposed with respect to said radial force in order to radially and inelastically deform the plug into the walls of the conduit.

2. The method of claim 1, wherein the pull-rod member is detachably connected to the plug.

3. A method of plugging a conduit with an inelastically deformable plug having a closed distal end and an open proximal end that leads to a cavity disposed within the shell, wherein the distal end of the cavity includes a means for connecting a pull-rod member, comprising the steps of detachably connecting a pull-rod to the proximal end of said cavity, and conducting a pressurized fluid to said cavity in order to radially expand said plug into sealing engagement with the inner wall of said conduit while compressing said plug along the longitudinal axis of said conduit by applying a tensile force to said pull-rod member to inelastically deform said plug into said wall of the plug conduit, to sealingly engage the open end of the plug against a sealing member to prevent the escape of pressurized fluid from said cavity, and to counteract a net distally directed component of motion that the pressurized fluid exerts on the plug.

4. The method of claim 3, wherein said conduit is surrounded by a structure that is elastically deformable but not inelastically deformable.

5. The method of claim 4, wherein said conduit is a tube formed from an alloy that includes nickel.

6. The method of claim 5, wherein said plug is formed from an alloy that includes nickel.

7. The method of claim 3, wherein the tensile force applied to said pull-rod member is between about 3,000 and 25,000 pounds.

8. The method of claim 3, wherein the fluid contained within the cavity is pressurized to between about 20,000 and 32,000 psi.

9. A plugging apparatus for plugging a conduit comprising:
   (a) an inelastically expandable plug containing a cavity and an open end leading thereto, and
   (b) expansion means for applying a radially expansive force within the cavity of the plug, including means for injecting a pressurized fluid through the open end of said plug a pull-rod member detachably connected to a plug wall defining a distal end of said cavity for applying compressive force across the portion of the plug containing the cavity that is substantially orthogonal to the radially expansive force exerted by the pressurized fluid in order to inelastically expand the plug into the walls of the conduit, and a sealing member that sealingly engages said open end as a result of said compressive force, wehrein said pull-rod member also includes a piston means that communcates with said pressurized fluid injected into the plug cavity for generating said compressive force.

10. A plugging apparatus for plugging a conduit, comprising:
    (a) an inelastically expandable plug having a closed distal end and an open proximal end, and a fluid-receiving cavity disposed in its interior having a distal end that terminates against the closed distal end of the plug, and a proximal end that communicates with the open proximal end of the plug, and
    (b) expansion means for simultaneously applying both a radially expansive force within the plug cavity by injecting a pressurized fluid therein, and a compressive force between the distal end and proximal ends of the cavity in order to inelastically expand the plug into the walls of the conduit, wherein the expansion means includes a pull-rod member that is detachably connectable to the distal end of the cavity, and which includes a piston means that communicates with said pressurized fluid for generating and applying said compressive force to said plug.

11. The apparatus of claim 10, wherein said expansion means further includes a sealing member that sealingly engages the open end of the plug as a result of the compressive force applied to said plug by said pull-rod member.

12. The apparatus of claim 11, wherein the amount of tensile force applied by the pull-rod member to compress the plug is greater than the net hydraulic force the the pressurized fluid in the plug cavity applies against the sealing member.

13. The apparatus of claim 10, wherein the distal ends of both the plug cavity and the pull-rod member include mating threads for detachably connecting the pull-rod member and the plug.

14. The apparatus of claim 10, wherein the thickness of the walls of the plug between the distal and proximal ends of the cavity is substantially uniform, and wherein the exterior of the plug wall containing said cavity is circumscribed by at least two integrally formed lands.

15. A plugging apparatus for plugging a metalic tube, comprising:
(a) a metallic plug having a generally cylindrical exterior that includes a closed distal end and an open proximal end, and a generally cylindrical cavity concentrically disposed along the axis of rotation of the cylindrical plug, wherein the distal end of the cavity terminates at the closed distal end of the plug and the proximal end of the cavity communicates with the open end of the plug,
(b) expansion means for simultaneously applying both a radially expansive force to the plug by conducting a pressurized fluid to the plug cavity, and a compressive force on the plug between the distal end of the cavity and the proximal end of the plug in order to expand the exterior of the plug into sealing engagement with the tube, wherein the expansion means includes a sealing member, and wherein said compressive force applied to the plug further serves to sealingly engage the open end of the plug against the sealing member.

16. The apparatus of claim 15, wherein the expansion means includes a pull-rod member that is insertable through the open end of the plug and detachably connectable to the plug in the vicinity of the distal end of the cavity, and which has a piston means that communicates with said pressurized fluid for generating and applying said compressive force to said plug.

17. The apparatus of claim 16, wherein the distal end of the cavity is threaded, and wherein the end of the pull-rod member has mating threads for detachably connecting the pull-rod member to the plug.

18. A plugging apparatus for plugging a conduit surrounded by a structure that is elastically deformable but not inelastically deformable, comprising:
(a) an inelastically expandable plug having a closed distal end and an open proximal end, and a fluid-receiving cavity disposed in its interior that has a distal end that terminates against the closed distal end of the plug, and a proximal end that communicates with the open proximal end of the plug, and
(b) expansion means for applying both a radially expansive force to the plug by conducting a pressurized fluid therein that radially expands the outer surface of the plug into sealing engagement with the inner wall of the conduit, and a compressive force between the distal and proximal ends of the cavity for inelastically deforming the outer surface of the plug into sealing engagement with the inner wall of the conduit, wherein said expansion means includes a sealing member, and wherein the compressive force applied to the plug serves to sealingly engage the open end of the plug against the sealing member.

19. The apparatus of claim 18, wherein the plug includes a middle portion that is substantially tubular, wherein the inside wall of said middle portion defines at least in part said cavity, and the outside wall of said middle portion is circumscribed by at least two integrally formed lands.

20. The apparatus of claim 19, wherein the tubular walls of the middle portion of the plug are of substantially uniform thickness, and wherein the plug includes walls of greater thickness on the distal and proximal ends of its middle portion to facilitate an inelastic deformation of the middle portion of the plug into sealing engagement with teh conduit when said compressive force is applied.

21. The apparatus of claim 20, wherein said lands are slightly tapered toward their outer edges in order to concentrate the area of sealing engagement between the plug and the inner wall of the conduit.

22. The apparatus of claim 18, wherein said expansion means includes a pull-rod member that is detachably connectable to the interior of the plug in the vicinity of the distal end of the cavity, means for applying a tensile force to said pull-rod member, and said sealing member.

23. An apparatus for plugging the open end of a metallic tube surrounded by a tubesheet, comprising:
(a) an expandable plug formed from a metal that is inelastically expandable, the exterior of the plug being substantially cylindrical and having a closed distal and an open proximal end, and the interior of said plug containing a substantially cylindrical cavity that is concentrically aligned with respect to the outside of the plug, and whose proximal end leads into the open end of the plug, wherein the distal end of the cavity is threaded, and
(b) an expansion means for inelastically expanding the exterior of the plug into sealing engagement with the inner wall of said tube, including means for conducting a pressurized fluid into said cavity to radially expand the exterior of the plug, a pull-rod member having a threaded end that is insertable through the open end of the plug and detachably connectable to the distal threaded end of the plug cavity and which includes a piston means that communicates with the pressurized fluid for generating and applying a compressive force to the plug between the distal end of the cavity and the proximal end of the plug, a sealing member for both preventing said plug from being withdrawn from said tube when said tensile force is applied to said pull-rod member and for sealingly engaging the open proximal end of the plug to prevent the escape of pressurized fluid from the plug cavity,
wherein said pressurized fluid radially expands said plug while said pull-rod member and sealing member apply a net compressive force across the distal and proximal ends of the plug.

24. The apparatus of claim 23, wherein the plug includes a middle portion that is substantially tubular, wherein the inside wall of said middle portion defines at least in part said cavity, and the outside wall of said middle portion is circumscribed by at least two integrally formed lands.

25. The apparatus of claim 24, wherein the tubular walls of the middle portion of the plug are of substantially uniform thickness, and wherein the plug includes walls of greater thickness on the distal and proximal ends of its middle portion to facilitate an inelastic deformation of the middle portion of the plug into sealing engagement with the tube when said compressive force is applied.

26. The apparatus of claim 25, wherein the threaded distal end of the cavity and the opening in the plug leading to the proximal end of said cavity have a smaller cross-sectional area than said cylindrical cavity.

27. The apparatus of claim 25, wherein the threaded distal end of the cavity and the opening in the plug leading to the proximal end of the cavity have substantially the same cross-sectional area.

28. The apparatus of claim 25, wherein both the tube and the plug are formed from Inconel ®.

29. The apparatus of claim 25, wherein the sealing member includes an O-ring that circumscribes the proximal edge of the plug in order to facilitate a fluid-tight seal between the plug and the sealing member during the expansion operation.

30. The apparatus of claim 25, wherein said expansion assembly includes a bore for conducting said pressurized fluid into an annular space defined between the outer surface of the pull-rod member and the surface defining the cavity within the plug.

31. The apparatus of claim 22, wherein said lands are slightly tapered toward their outer edges in order to concentrate the area of sealing engagement between the plug and the inner wall of the tube.

32. The apparatus of claim 22, including six lands equidistantly spaced along the axis of rotation of the middle portion of the plug.

33. A plugging apparatus for plugging a conduit, comprising:
   a. an inelastically expandable plug containing a cavity, and member for applying a compressive force to the plug when a tensile force is applied to said member in order to inelastically expand the plug into the walls of the conduit, as well as means for simultaneously injecting a pressurized fluid within the cavity for applying a radially expansive force when said pull-rod member applies said compressive force in order to reduce the tensile load applied to said pull-rod to generate said compressive force.

34. A plugging apparatus for plugging a conduit, comprising:
   (a) an inelastically expandable plug having a closed distal end and an open proximal end, and a fluid-receiving cavity disposed in its interior having a distal end that terminates against the closed distal end of the plug, and a proximal end that communicates with the open proximal end of the plug, and
   (b) expansion means for simultaneously applying both a radially expansive force within the plug cavity by injecting a pressurized fluid therein, and a compressive force between the distal end and proximal ends of the cavity in order to inelastically expand the plug into the walls of the conduit, wherein said expansion means includes a pull-rod member that is detachably connectable to the closed distal end of the plug for applying said compressive force, when a tensile force is applied thereto, and wherein the tensile load on the pull-rod member is substantially reduced by the injection of said pressurized fluid.

35. A plug for plugging a conduit comprising a shell having a closed distal end and an open proximal end, and a middle portion having a cylindrical exterior that contains a cavity that leads to said open end for receiving a pressurized fluid that radially expands said middle portion, wherein said shell further contains a connecting means located at the distal end of the cavity for detachably connecting an interior distal wall of said shell to a pull-rod member disposed through said cavity that applies enough compressive force to said shell wall to inelastically deform said shell into a radially expanded shape.

36. The plug of claim 35, wherein said connecting means is a plurality of threads in said interior distal shell wall capable of engaging an end of said pull-rod member having mating threads.

37. The plug of claim 35, wherein the walls of the shell forming the plug are of a substantially uniform thickness in said middle portion, and wherein the walls of the shell are of greater thickness on the proximal and distal ends of the plug to facilitate the deformation of said middle portion into a radially expanded shape when said pressurized fluid is received in said cavity and said distal end of the cavity is connected to said pull-rod member.

38. The plug of claim 37, wherein the thicker shell walls on the distal and proximal ends of the shell each include a tapered section whose thinnest portion melds with the distal and proximal edges of the middle portion of the shell are of greater thickness on the proximal middle portion in said radially expanded shape.

39. The plug of claim 38, wherien the thickest portions of each of said tapered wall sections meld in with another wall portion of uniform thickness that is substantially greater than the thickness of the shell wall in said middle portion.

40. The plug of claim 38, wherein said cavity is uniformly cylindrical from the open to the closed end of the shell, and wherein said tapered wall portions are defined on the exterior of said shell.

41. The plug of claim 38, wherein the exterior of the plug is cylindrical from the open to the closed end of the shell, and wherein the tapered wall portions are defined in the interior of said shell.

42. The plug of claim 79, wherein the middle portion of the shell is circumscribed by at least two lands.

43. The plug of claim 42, wherein said lands are tapered toward their outer edges.

44. The plug of claim 43, wherein said middle portion includes six uniformly spaced lands.

45. A method of plugging a conduit with an inelastically deformable plug containing a cavity, comprising the step of applying a radially expansive force within the cavity of the plug by injecting a pressurized fluid within said cavity while simultaneously applying a compressive force across the plug that is orthogonally disposed with respect to said radial force in order to radially and inelastically deform the plug into the walls of the conduit, wherein the application of said radially expansive force substantially reduces the amount of compressive force that would otherwise be necessary to inelastically deform said plug into said conduit walls.

* * * * *